Feb. 16, 1937.  S. MOORE  2,071,082
APPARATUS FOR THE DISTILLATION, CALCINATION, OR HEAT TREATMENT
OF COAL, SHALE, PEAT, WOOD, AND OTHER SUITABLE
FRAGMENTARY SOLID AND/OR SEMISOLID MATERIALS
Filed Feb. 14, 1935  2 Sheets-Sheet 1

Inventor
Samuel Moore.

By William C. Sinton.
Attorney.

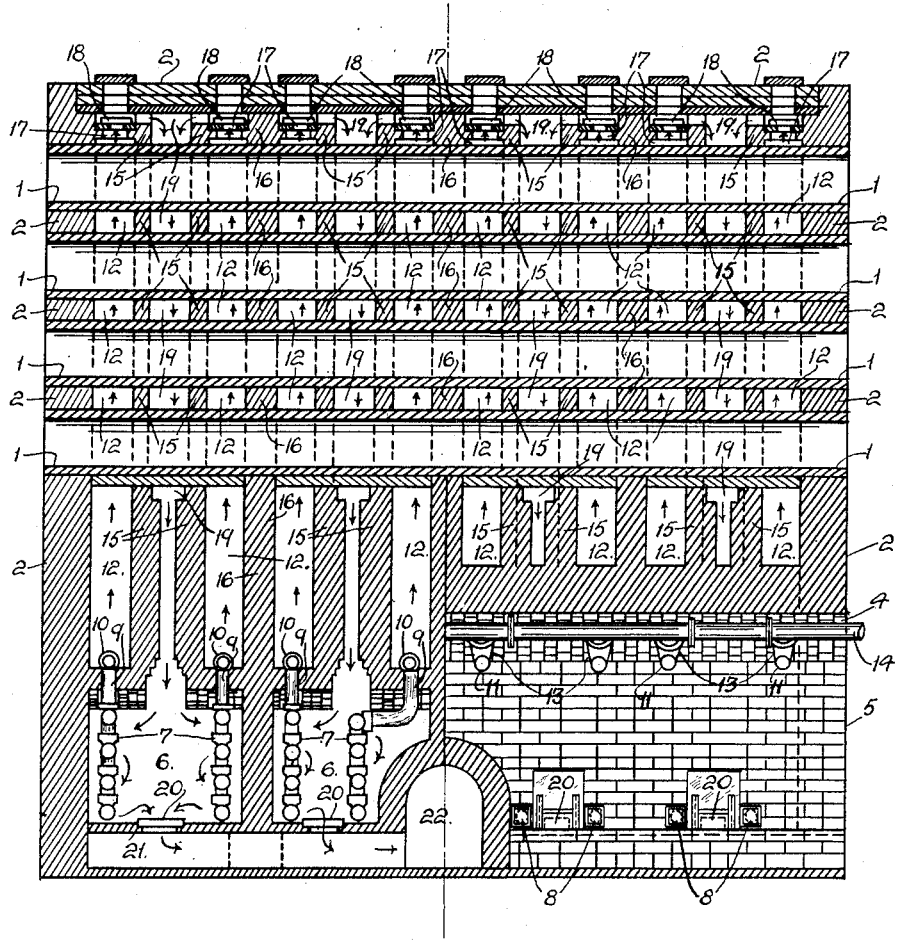

Patented Feb. 16, 1937

2,071,082

UNITED STATES PATENT OFFICE 2,071,082

APPARATUS FOR THE DISTILLATION, CALCINATION, OR HEAT TREATMENT OF COAL, SHALE, PEAT, WOOD, AND OTHER SUITABLE FRAGMENTARY SOLID AND/OR SEMISOLID MATERIALS

Samuel Moore, Hoylake, England, assignor to Stellite Limited, Queen's Ferry, near Chester, England, a British company Application February 14, 1935, Serial No. 6,608
In Great Britain February 26, 1934

1 Claim. (Cl. 202—116)

This invention relates to apparatus for the distillation, calcination, or heat treatment of coal, shale, peat, wood and other suitable fragmentary solid or semi-solid materials, according to the method to which the material is delivered into and conveyed through externally heated horizontal or substantially horizontal retorts.

My invention consists in a setting for distributing and regulating heating gases within retort-surrounding jackets or chambers so that such gases which are generated by the combustion of gaseous fuel within combustion chambers of the setting are induced upward and around external surfaces of the retorts exposed therein and then downward into spaces or down-flues arranged in or between separate heat zones created by division walls encompassing the retorts, whereby adjacent retort surfaces are heated, such circulation of the heating medium ensures, if desired, even or uniform heat treatment of the whole of the retort areas or surfaces exposed to heat, the degree of heat treatment of the or each zone or zones being preferably governed or controlled by means of dampers disposed in passages situated between the upper portions of said combustion chambers, said down draught being preferably regulated by dampers disposed in passages connecting flue chambers with discharge flues leading by way of a main flue to a chimney, exhaust fan, or the like.

The temperatures of the heat zones created by said division walls may be regulated to effect, if desired, variation of the temperature throughout the length of the retorts to suit the nature and requirements of the material to be treated (as, for instance, it may be found advisable to employ the first heat zone for extracting the moisture from the material) and in this connection each zone may be provided with separate gas, air and damper or chimney supply and control.

It is also arranged in one preferred construction that the heated gases passing in through said flue chambers shall heat piping—which may be constituted by hollow fire-clay bricks—situated therein and arranged to convey air for supporting combustion of the fuel passing therethrough into said combustion chambers from valve-controlled sources adapted to regulate their volume and degrees of heat as desired; said controlled sources are disposed within a control chamber adapted to contain means such as valves and damper actuating mechanisms whereby supplies of gas and air, also preheated air are regulated, the passage openings between flue chambers being increased or diminished to vary the powers of induced draught which causes the heating products of the gaseous mixtures consumed to rise within the heat zones and circulate between said division walls which are preferably laterally spaced apart and disposed around horizontally positioned retorts to constitute combustion chambers associated with damper control means directing the heating products generated therein, down adjoining spaces formed in the thicknesses of alternating division walls into the flue chambers, discharge flues, main flue and chimney in such manner that any desired temperature required for the distillation, calcination or heat treatment of coal, etc., is evenly distributed and maintained constant as required.

I will further describe my invention with the aid of the accompanying sheet of explanatory drawings which illustrate, by way of example only, one mode of carrying the invention into effect.

In said drawings:—

Fig. 2 is a sectional elevation taken as on line A—A, Fig. 1, and

Fig. 3 is a sectional elevation taken as on line B—B, Fig. 1.

Figure 1:
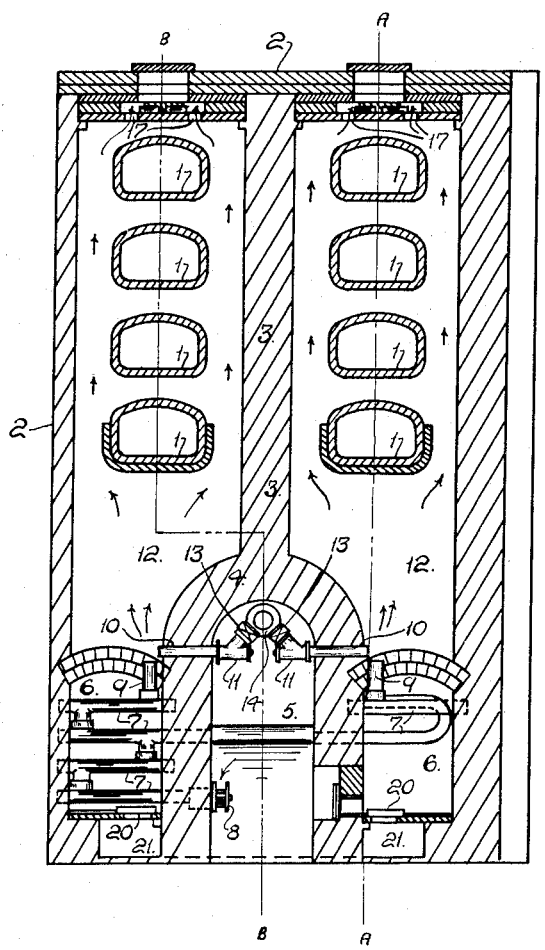
Fig. 1 is a part-sectional elevation of a setting constructed for the reception of two series of retorts arranged one above another, the setting being subdivided into four heat zones.

1, 1 indicate horizontal retorts of tube-like construction arranged in parallel disposition within a chamber or housing structure 2.

Said retorts 1 are, in the example illustrated, arranged in sets or series one above another, adjacent sets being laterally spaced apart by means of a vertical division wall 3 extending from one side to the other of housing 2.

The bottom end of said wall 3 terminates upon the arch 4 of a chamber 5 extending across said housing 2 and parallel with the line of retorts 1: and disposed on each side of, and parallel with said chamber 5 are flue chambers 6 containing pipes 7 adapted to convey air for supporting combustion by way of valves 8 situated in chamber 5 to a plurality of vertical branches 9 extending through the roofs of flue chambers 6 and having their discharge ends positioned immediately adjoining the open feed ends 10 of gas supply pipes 11 situated in the lower part of combustion chambers 12 adjacent to the walls of chamber 5, which chamber contains valves 13 whereby admission of heating gas from the main pipe line 14 may be controlled.

Extending upwardly at right angles from the top of flue chambers 6 and on each side of the outlets of the air and gas pipes 10 and 11, are parallel hollow division walls 15 alternating with solid division walls 16 which latter create by subdivision a series of four separate heat zones of the setting, said walls 15 and 16 are carried upwards around each of the retorts 1 to the roof of combustion chambers 12 where the walls 15 and 16 terminate in the form of passages or ducts 17 with which are associated control dampers 18, said passages being adapted to communicate with the upper portions of the spaces of walls 15 which provide a plurality of down-flues 19 arranged to conduct the gaseous heating medium around retorts 1 down into flue chambers 6 to heat the secondary air supply pipes 7, past regulating dampers 20 and into discharge flues 21 communicating with a main flue 22 leading to a chimney; it will thus be obvious that the temperatures of each zone of the setting may be regulated to suit the nature and requirements of the material to be treated, for instance, it may be deemed advisable to employ the first heat zone for extracting the moisture from the material.

In operation, and when it is desired to effect even or uniform heating of the retort, gaseous fuel—say coal gas—is introduced into the heat zones created by said solid division walls 16 by way of air valves 8 and gas control valves 13 through air inlets 10 and gas inlets 11 and fired (a hand hole being provided in the wall of the setting for the introduction of means for starting ignition) within combustion chamber 12, the heated products of combustion therefrom in passing upwards within the zones encounter and encompass the external surfaces of the series of retorts 1 exposed therein which portions of said retorts become heated as the heating products of combustion pass around same up to the roofs of said combustion chambers 12 by way of control dampers 18 into ducts 17 and thence down flues 19 to encounter and encompass with additional heating effect adjoining exposed surfaces of retorts 1 situated within said down-flues 19.

Said heated products of combustion—now at a reduced temperature—enter flue chambers 6, heat the secondary air pipes 7 and then pass to the chimney by way of control dampers 20 discharge flues 21 and main flue 22.

The system of even or uniform heating as hereinbefore described enhances the flexibility of the setting and so avoids excessive strains and expansion during the working of same.

What I claim as my invention and desire to secure by Letters Patent is:—

In an apparatus for heating coal, shale and the like, a setting containing vertically aligned groups of horizontal and spaced retorts open at their ends, a longitudinal vertical wall separating the groups of retorts for independent operation, vertical walls transverse to the retorts dividing each group into separately fire zones, each of said zones being formed with an intermediate vertical wall transverse to the retorts to form flues on each side of said intermediate wall for upward passage of heating gases to contact and encircle the retorts, an offtake flue, and said intermediate wall having passages arranged therein for the gases to pass downwardly through to said offtake flue.

SAMUEL MOORE.